United States Patent Office 3,649,711
Patented Mar. 14, 1972

---

3,649,711
PROCESS FOR IMPROVED CURING OF UNSATURATED POLYESTER RESIN COMPOSITIONS AND RESULTING PRODUCT
Jimmie Sturgis Payne, Jr., Austin, Tex., assignor to Reichhold Chemicals, Inc., White Plains, N.Y.
No Drawing. Continuation-in-part of application Ser. No. 694,407, Dec. 29, 1967. This application Mar. 20, 1970, Ser. No. 21,530
Int. Cl. C08f 21/00, 21/02
U.S. Cl. 260—863
10 Claims

ABSTRACT OF THE DISCLOSURE

The improvement in the process of curing a polymerizable blend of (A) an unsaturated polyester and (B) a polymerizable monomer with a peroxyester and resulting product, which process comprises the addition of cobalt bromine, such addition showing synergistic action with said peroxyester.

---

The present application discloses an improvement in the process of curing a polymerizable blend of (A) an unsaturated polyester and (B) a polymerizable monomer with a peroxyester and resulting product which process comprises the addition of cobalt bromine, such addition showing synergistic action with said peroxyester.

The present application is a continuation-in-part of my earlier pending application Ser. No. 694,407, filed Dec. 29, 1967, now abandoned the entire disclosure of which is hereby incorporated by reference as part of the present disclosure.

Unsaturated polyester resins contain polyesters formed by interacting at elevated temperatures one or more unsaturated or saturated dicarboxylic acids, wherein at least one component contains alpha-beta unsaturation, with one or more polyhydric alcohols until an acid value of about between 5 and 80 and preferably between 20 and 50 is reached, whereupon the resultant unsaturated alkyd is diluted with a polymerizable monomer or cross-linking agent, containing a stabilizer such as toluhydroquinone or para benzoquinone or the like and having at least one —C=CH₂ group of which styrene may be mentioned as illustrative. The weight ratio of the alkyd to the polymerizable monomer may be varied between about 95:5 and 5:95 depending on the kind of monomer and on the behavior of the alkyd. The preferred ratio is generally between about 55 alkyd to 45 monomer and about 85 alkyd to about 15 monomer.

The ethylenically unsaturated alpha-beta dicarboxylic acids, considered as starting materials, may include among others maleic acid, fumaric acid, aconitic acid, itaconic acid, mono-chloromaleic acid, etc., and the corresponding anhydrides of the cis-acids and mixtures thereof. These ethylenically unsaturated dicarboxylic acids may be partially replaced with either saturated carboxylic acids or those dicarboxylic acids which contain only benzenoid unsaturation. This group includes among others adipic acid, azelaic acid, sebacic acid, dimerized fatty acids, phthalic acid, isophthalic acid, terephthalic acid, tetrahydrophthalic acid, tetrachlorophthalic anhydride, chlorendic acid, hexahydrophthalic acid, etc., or mixtures thereof, as well as the anhydrides of those acids which are capable of forming them. Up to ten mols of those dicarboxylic acids having no ethylenic unsaturation may be used per each mol of ethylenically unsaturated dicarboxylic acid continuing no unsaturation other than benzenoid but such molecular ratio is preferably between about 5:1 and 1:5.

The said polyhydric alcohols considered as starting materials or as reactants for this reaction include saturated and unsaturated aliphatic glycols, such as ethylene glycol, propylene glycol-1,2, propylene glycol-1,3, butylene glycol-1,2, butylene glycol-1,4, butylene glycol-1,3, pentane diol-1,5, the hexylene glycols, neopentyl glycol, 2-butene-1,4 diol, etc. They also include dihydroxy polyethers, such as diethylene glycol, di-propylene glycol, triethylene glycol and also the high polyglycols of waxy consistency, which latter are called commercially "Carbowaxes" (manufactured by Union Carbide Corporation). The above are mentioned as illustrative only, and not by way of limitation.

The group of polymerizable monomers or cross-linking agents includes the vinyl monomers, such as styrene, vinyl toluene, diallyl phthalate, triallyl cyanurate, triallyl citrate, diallyl maleate, diallyl fumarate, the isomers of dichlorostyrene, etc. and mixtures thereof. The groups further include methyl methacrylate, ethyl ethacrylate, methyl acrylate, ethyl acrylate, etc., and mixtures thereof.

In order to prevent gelation during manufacture and storage, the polyester resin may be stabilized as is known in the art. Some of the well-known stabilizers are of the phenolic or quinoid type and include hydroquinone, quinone, tertiary butyl catechol, etc., and others, such as quaternary ammonium salts, esters of phosphorus acid, copper salts, gaseous oxygen, etc. The above well-known stabilizers are mentioned by way of illustration only and not by way of limitation.

When it is desired to polymerize these unsaturated polyesters with a polymerizable monomer to a useful solid product, some source of free radicals may be added. The free radicals cause copolymerization of the monomer and the unsaturated polyester to give a cross linked material whose properties are dependent on the original choice of the dicarboxylic acids, polyhydric alcohols or liquid monomers.

In order to cause polymerization, a peroxide catalyst is added. The present invention relates in particular to the use of peroxyesters as catalysts. These peroxyester catalysts insure a far superior stability in the polyester resin system than do other peroxide catalysts. However, these peroxy catalysts could only be used at elevated temperatures, to achieve proper cure. No effective promotion system was known, which would allow curing at room temperature.

The ever increasing application of unsaturated polyester resins in almost every sector of industry has created a need for resins which will still give faster gels and cures at room temperature after being catalyzed.

It is therefore an objective of this invention to develop a novel promoter system for the polymerization of polyesters.

Another object of this invention is to develop a novel promoter system for the preparation of polyesters, which will cause the polymerization of said polyester to proceed more rapidly and under controlled conditions.

And it is still another object of this invention to develop a novel promoter system, which will result in polyester resins with improved stability and lighter color.

Still further objects and the wide scope of applicability of the present invention will become apparent from the detailed description given hereinafter. It shoud be understood, however, that the detailed description and specific examples, while indicating preferred embodiments of the invention, are given by way of illustration only, since various changes and modifications within the spirit and scope of the invention will become apparent to those skilled in the art from the detailed description.

Various polymerizations have been described where agents are employed which promote or accelerate polymerization of curing in such a way that, by adding them to the polymerizable material in conjunction with an organic peroxide as a catalyst, a faster rate of polymerization or curing is achieved and acceptable products obtained. Well known promoters of this type include metal salts of octoic or naphthenic acid such as iron, cobalt or manganese octoate and naphthenate or the like, sulfur compounds, organic phosphorus compounds, quaternary onium compounds or the like because of the outstanding performances achieved therefrom.

It is now found that the use of cobalt bromide ($CoBr_2$) as a promoter allows polyesters to be cured at room temperature using the above typed peroxyesters as catalysts. There appears to be no limitation on the peroxyester catalysts. Illustrative examples of peroxyester catalysts that may be used include t-butylperoxy benzoate, di-t-butyl diperoxyphthalate, t-butylperoxy-2-ethyl, hexanoate, 2,5 - dimethyl - 2,5 - bis-(2 - ethyl hexanolperoxy)-hexane, (t-butylperoxy - 2,2,4-trimethyl-3-oxovalerate), t-butyl peroxyacetate, t-butyl peroxyisobutyrate, t-butyl peroxypivalate, t-butylperoxy-3-hydroxy butyrate and t-butylperoxy-3-hydroxy propionate and the like and mixtures thereof.

The cobalt bromide promoter is also effective with other catalysts such as ketone peroxides and hydroperoxides. Examples of other catalysts effected by this promoter include methyl ethyl ketone peroxide, cyclohexanone peroxide, hydrogen peroxide, t-butyl hydrogen peroxide and cumene hydroperoxide, and the like and mixtures thereof.

The cobalt bromide can be prepared in the resin for example, by addition to the resin of cobalt naphthenate and a soluble bromide salt in a suitable solvent such as, for example, lithium bromide in dipropylene glycol. Such a procedure is fully described in copending application to Payne Ser. No. 694,407 which was filed on Dec. 29, 1967. Such mixtures are effective promoters for peroxyester catalysts. However, superior results are obtained when cobalt bromide per se is used. A simple way to introduce the cobalt bromide into the resin is as a solution in a suitable carrier solvent. Suitable carrier solvents for the cobalt bromide may include such polar organic compounds as alcohols, ethers, esters, ketones, amides, amines and lactones and mixtures thereof. For example, by way of illustration only, the following compounds may be used:

Alcohols: methanol, ethanol, isopropanol, t-butanol
Glycols: ethylene glycol, propylene glycol, butylene glycol, hexylene glycol
Ethers: dioxane, furane, tetrahydrofurane
Esters: ethyl acetate, butyl acetate, ethylene glycol diacetate
Ketones: acetone, methyl ethyl ketone, mesityl oxide, methyl butyl ketone, ethyl amyl ketone
Amides: dimethyl formamide, formamide, dimethyl acetamide, pyrrolidone, N-methyl pyrrolidone
Amines: pyridine, piperidine, piperazine, N,N'-dimethyl-piperazine
Lactones: gamma butyrolactone, epsilon caprolactone Also, of course, one can use as carrier solvents many compounds having more than one functional group. For example: the keto alcohol, diacetone alcohol; the ether, ester alcohol, diethylene glycol mono acetate; the amino alcohols, nitrilo triethanol, diethanol amine.

Superior results are obtained when the carrier solvents are ethers and/or alcohols. If desired the cobalt bromide may be dissolved directly in the resin. The addition of the cobalt bromide solution or the cobalt bromide itself may take place at any stage of resin manufacture or as late as immediately before or after the addition of the peroxyester catalyst. In addition, very low levels of acid or water may be added with the cobalt bromide to further accelerate the cure though they are not essential.

While the major advantage of this invention is the ability to obtain rapid, room temperature cures of polymerizable polyester compositions other advantages will become apparent to those skilled in the art from the following detailed examples.

EXAMPLE I

An unsaturated polyester resin was prepared by heating to a temperature of 215° C. a mixture of two moles of phthalic anhydride and 1 mole of maleic anhydride with 3.3 moles of propylene glycol until the acid number dropped to 20 or less. Two parts of the resulting alkyd were dissolved in one part of styrene, at a temperature of 60–70° C. and $3 \times 10^{-4}$ parts of hydroquinone added, to prevent premature gelation.

EXAMPLE II 100 grams of the resin from Example I were cured at ambient conditions by adding 1% t-butyl peroxy benzoate only and no promoter. The resulting mixture (did not) gel (or cure) in over 24 hours.

EXAMPLE III 100 grams of resin from Example I were cured at ambient conditions by adding 1% t-butyl peroxybenzoate, then 0.7% of a 25% solution of cobalt bromide in methyl alcohol. The mixture gelled in 15 minutes and cured in 22 minutes, to give a well cured rigid solid. The effect of the cobalt bromide is startlingly obvious to the observer.

EXAMPLE IV

Example III was followed except that 0.5% of the promoter solution was added. The mixture gelled in 10.5 minutes and cured in 18 minutes to give a well cured rigid solid.

EXAMPLE V

Example III was followed except that 0.3% of the promoter solution was added. The mixture gelled in 9 minutes and cured in 19 minutes to give a well cured rigid solid.

EXAMPLE VI

Example III was followed except that 0.1% of the promoter solution was added. The mixture gelled in 13.5 minutes and took over 24 hours to cure to a well cured rigid solid.

EXAMPLE VII 100 grams of resin from Example I were cured at ambient conditions by adding 1% t-butyl peroxy, 2-ethyl hexanoate and then 0.3% of a 25% solution of cobalt bromide in N-methyl pyrrolidone. The mixture gelled in 5.5 minutes and cured in 15 minutes to give a well cured rigid solid.

EXAMPLE VIII

Example VII was followed exactly except that 1% 2,5-dimethyl-2,5-bis-(2-ethyl hexanoyl peroxy)-hexane was used. The mixture gelled in 5.75 minutes and cured in 12.5 minutes to give a well cured rigid solid.

EXAMPLE IX

Example VII was followed exactly except that 1% t-butyl peroxy-3-hydroxy propionate was used. The mixture gelled in 9.5 minutes and cured in 20 minutes to give a well cured rigid solid.

EXAMPLE X

Example VII was followed exactly except that 1% t-butyl peroxy-2,2,4-trimethyl-3 oxo-valerate was used. The mixture gelled in 19 minutes and cured in 35 minutes to give a well cured rigid solid.

EXAMPLE XI

Example VII was followed exactly except that 1% t-butyl peroxy benzoate was used. The mixture gelled in 9 minutes and cured in 19 minutes to give a well cured rigid solid.

EXAMPLE XII

Different 100 gram portions of resin from Example I were cured at ambient conditions by first adding 0.3% of a 25% solution of cobalt bromide in methyl alcohol and then 1% of a different peroxide catalyst to each. The results are given in Table I.

TABLE I

| Catalyst | Promoter | Gel time, minutes | Cure time, minutes |
|---|---|---|---|
| Methyl ethyl ketone peroxide | 0.3% of a 25% solution of $CoBr_2$ in MeOH. | 6.5 | 15.5 |
| Cyclohexanone peroxide | do | 24 | 30.5 |
| Hydrogen peroxide (22%) | do | 20 | 50 |
| t-Butyl hydroperoxide | do | 135 | 172 |
| Cumene hydroperoxide | do | 145 | 165 |
| Lauroyl peroxide | do | None | |
| Benzoyl peroxide | do | None | |

EXAMPLE XIII

Table II shows the effect of added acid or water on catalyzed promoted resin samples. Different 100 gram portions of resin from Example I were cured at ambient temperatures by first adding 1% t-butyl peroxy benzoate and then 0.3% of a 25% solution of cobalt bromide in N-methyl pyrrolidone and different amounts of HBr and water.

TABLE II

Promoter: 0.3% $CoBr_2$ (25%) in N-methyl pyrrolidone
Catalyst: 1% t-butylperoxy benzoate

| Additive | Percent | Gel time, min. | Cure time, min. |
|---|---|---|---|
| None | | 34 | 50 |
| HBr(48%) | 0.01 | 16½ | 27 |
| HBr(48%) | 0.02 | 14½ | 25 |
| HBr(48%) | 0.03 | 14½ | 25 |
| HBr(48%) | 0.05 | 17 | 29 |
| $H_2O$ | 0.02 | 29 | 42 |

What is claimed is:

1. In a process for catalytic polymerization of a polymerizable blend comprising blending (A) an unsaturated polyester of (1) a dihydric alcohol and (2) an ethylenically unsaturated dicarboxylic acid with (B) a polymerizable monomer containing ethylenic unsaturation and (C) an organic peroxyester being at least one member selected from the group consisting of t-butyl peroxy benzoate, t-butyl peroxy-2-ethyl-hexanoate, 2,5-dimethyl-2,5-bis-(2-ethyl-hexanol peroxy)-hexane, t-butyl peroxy-2,2,4-trimethyl-3-oxovalerate, t-butyl-peroxy-3-hydroxy-butyrate, t-butyl peroxy-3-hydroxy-propionate, di-t-butyl diperoxyphthalate, t-butyl peroxy acetate, t-butyl peroxy isobutyrate, t-butyl peroxy pivalate and mixtures thereof; the improvement which consists of adding (D) preformed cobaltous bromide ($CoBr_2$) as a promoter whereby the blend may be cured at room temperatures using organic peroxy esters as catalysts.

2. The process according to claim 1 wherein the quantity of (D) ranges from about 0.0125% to about 0.25% by weight based upon the weight of the resin used.

3. The process according to claim 2 wherein the percent of (D) is 0.075% based upon the weight of the resin used.

4. The process according to claim 1 wherein (D) is dissolved in a solvent.

5. The process according to claim 1 wherein (D) is dissolved in a polar organic compound.

6. The process according to claim 5 wherein the polar organic compound is at least one member selected from the group consisting of alcohols, ethers, esters, ketones, amides, amines, lactones and mixtures thereof.

7. The process according to claim 5 wherein the organic compound is selected from the class consisting of N-methyl pyrrolidone and methyl alcohol.

8. The process according to claim 1 wherein (A) is an unsaturated polyester of (1) propylene glycol and (2) maleic anhydride and (B) is styrene monomer.

9. The process according to claim 8 wherein phthalic anhydride is added to (2).

10. The process according to claim 1 wherein HBr and water are added with (D).

References Cited

UNITED STATES PATENTS

| | | | |
|---|---|---|---|
| 2,949,361 | 8/1960 | Agens | 96—115 |
| 3,227,665 | 1/1966 | Fourcade et al. | 260—2.5 |
| 3,333,021 | 7/1967 | Geipert | 260—863 |
| 3,449,276 | 6/1969 | Rabenold et al. | 260—22 |

FOREIGN PATENTS

| | | |
|---|---|---|
| 1,070,819 | 12/1959 | Germany. |
| 898,111 | 6/1962 | Great Britain. |
| 121,759 | 1/1967 | Czechoslovakia. |

OTHER REFERENCES

Kolczynski et al.: "Activated Decomposition of Organic Peroxides in Unsaturated Polyester Resins" (1969), pp. 1–3.

Chem. Abst.: vol. 52; 10786-n & 10787a; Peschanski et al., Compt. Rend. 246, 1212–14 (1958).

Chem. Abst.: vol. 57, 5572c-e; Andreev et al., "Complex Formation in the $CoBr_2$—HBr—$H_2O$ System" (1962).

Chem. Abst.: vol. 63, 1244d; Krause et al., Z. Naturforsch; 206(2) 185–6, (1965).

MELVIN GOLDSTEIN, Primary Examiner